United States Patent [19]
Dezelan

[11] Patent Number: 5,999,127
[45] Date of Patent: Dec. 7, 1999

[54] SATELLITE COMMUNICATIONS FACILITATED BY SYNCHRONIZED NODAL REGRESSIONS OF LOW EARTH ORBITS

[75] Inventor: Richard W. Dezelan, Palos Verdes Estates, Calif.

[73] Assignee: The Aerospace Corporation, El Segundo, Calif.

[21] Appl. No.: 09/167,620

[22] Filed: Oct. 6, 1998

[51] Int. Cl.[6] ...................................................... H01Q 3/00
[52] U.S. Cl. .................... 342/359; 342/357.16; 342/354; 342/352; 701/226
[58] Field of Search .............................. 342/359, 357.16, 342/354, 352; 701/226

[56] References Cited

U.S. PATENT DOCUMENTS 5,119,225   6/1992   Grant et al. .

*Primary Examiner*—Theodore M. Blum
*Attorney, Agent, or Firm*—Derrick Michael Reid

[57] ABSTRACT

A satellite communication method enables a low earth orbit data collecting mission satellite to conveniently achieve continuous, real time, and cost effective global connectivity by "plugging in" to a constellation of low earth orbit communication satellites designed to provide mobile satellite service for terrestrial users. Orbit parameters for the mission satellite are selected to generate a nodal regression rate matched to that of the communication satellites so that initial alignment of orbit planes is sustained maintaining a favorable geometry between the communicating satellites. The resulting intra-satellite geometry is exploited through use of widebeam crosslink antennas, simplified pointing techniques, and variable transmission rates for optimum communication efficiency from the mission satellites to communication satellites and ground receivers.

19 Claims, 6 Drawing Sheets

ANTENNA POINTING AND LINK CLOSURE PROCESSES

MISSION ORBIT PLANE ALIGNED TO A BIG LEO ORBIT PLANE

IN-PLANE VIEW OF LEO & VLEO SATELLITE ORBIT PLANES

EDGE VIEW OF LEO AND VLEO SATELLITES ORBIT PLANES

ORBIT GEOMETRY

SATELLITE-TO-SATELLITE GEOMETRY

ANTENNA POINTING AND LINK CLOSURE PROCESSES

SATELLITE COMMUNICATIONS FACILITATED BY SYNCHRONIZED NODAL REGRESSIONS OF LOW EARTH ORBITS

STATEMENT OF GOVERNMENT INTEREST

The invention was made with Government support under Contract No. F04701-93-C-0094 by the Department of the Air Force. The Government has certain rights in the invention.

SPECIFICATION

FIELD OF INVENTION

The invention relates to the field of satellite communications, and more particularly to methods for facilitating the transmission of information between low earth orbiting data collection satellites and low earth orbiting communication satellites.

BACKGROUND OF THE INVENTION

There are numerous operational satellite systems currently deployed in space, and several more in the planning stages. Satellites orbit the earth at prescribed altitudes and orbit inclinations, the inclination being the angle the plane of the orbit makes with the plane of the earth's equator. Satellite orbits can be categorized in three altitude ranges: Low earth orbit (LEO) from 300 to 1500 km; medium earth orbit (MEO) from 10,000 to 20,000 km; and high earth orbit (HEO) from 35,000 km and above. Orbit altitudes and orbit inclinations are selected to achieve desired performance objectives (e.g., global access, ground resolution, orbit period, etc.), and also selected to avoid regions of high natural radiation which can damage satellite equipment.

A satellite system can be deployed as a single satellite or as a plurality or constellation of similar satellites that occupy the same spherical altitudes, and cooperate together in performing a mission. For example, many communication satellite systems operate at HEO altitudes at near-zero inclination. Their resulting 24-hour orbital periods coincide with the earth's rotational rate causing the satellite to remain fixed above a specified equatorial ground point, a feature that facilitates ground antenna pointing. The Global Positioning System (GPS) is a multi-ring 24-satellite MEO constellation that employs 20,000-km circular 12-hour orbits inclined at 55 degrees. U.S. Pat. Nos .5,551,624, 5,439,190, and 5,415,368 disclose MEO constellation of communication satellites in 10,000-km, six-hour orbits. IRIDIUM is a LEO constellation of 66 communication satellites at 785 km altitude equally distributed in six planes inclined at 86.4°. When specific mission satellites, such as earth imaging satellites, are deployed in the lower end of the LEO orbit range (for example between 300 to 600 km), the orbit is referred to herein as a very low earth orbit (VLEO).

A satellite constellation may feature crosslinked communications enabling inter-constellation connectivity in a tangential or lateral direction from one satellite to another satellite around the orbital sphere. This inter-constellation connectivity allows a message to be uplinked radially from a ground site to any satellite in the constellation, then relayed tangentially from satellite to satellite around the globe and then radially downlinked to a remote receiving ground site. Communication satellite constellations are typically crosslinked to enable global connectivity. A signal from the ground may be received by a satellite through a radially directed communication uplink, retransmitted by that satellite to a second satellite through a tangentially or laterally directed crosslink, and then retransmitted by the second satellite to a ground receiver through a radially directed downlink. Some communication satellites operate primarily as relays, where messages are received from the ground and simply retransmitted back to the ground at another location.

Earth-based or space-based microwave transmission can be directed through broad beams or narrow beams depending on the antenna design and transmission frequency, and are selected to be compatible with parameters and constraints of the particular link application in terms of range, satellite-to-satellite geometry dynamics, transmitter power, data rate, weather, or other operational factors. Broad beams or wide beams are created using small omni-directional antennas, and are best suited for coarse pointing, low signal power, low-data-rate applications. Narrow beams employ larger unidirectional antennas that require more precise pointing and generally deliver higher power to the receiver necessary for high-data-rate transmission. The beam width is selected to suit the particular application and can span the range from very broad to very narrow. The corresponding communications signals may include very low-data-rate command messages, or low-data-rate voice, or very high-data-rate multi-color images. There are always design trade-offs between transmitter power, beam widths, and data rates, but generally for high-data-rate communications the beam width is narrow and the power delivered to the receiver is high, and for low-data-rate communications and broadcasting the beam width is broad and the delivered power is lower. Satellite crosslinks generally employ very narrow microwave or laser transmission beams that focus the transmitted energy on the receiving antenna. Narrow beams allow efficient use of transmitter power over longer ranges, and maximize the transmitted data rate. A disadvantage of narrow beams is that they require very accurate pointing and tracking, and often require the use of a secondary wider beam to search for and acquire the receiver target and establish the link before narrow beam transmission can be initiated. This acquisition and hand-off procedure is repetitive as communicating satellites move in and out of view and the link must be rerouted.

LEO mission satellites that monitor the earth collecting environmental records or ground images generate large quantities of data at high rates. If the collection satellite operates in the "store-and-dump" mode, the collected data is electronically stored onboard until the satellite overflies a ground read-out station, whereupon the data must be downlinked at an accelerated rate while the satellite is in view of the ground station. This method of operation requires the satellite to have ample onboard data storage and read-out capability, and suffers inherent time delays between data collection and read-out opportunities. Today, if the collection satellite operates in a "real time" relay mode, a wideband (high-data-rate) space link must be established and maintained between the data collecting mission satellites and a mission specific or partially dedicated HEO relay communication satellites. This method of operation requires precise tracking over long ranges (~25,000 km) using very narrow beams, and involves periodic reacquisition procedures as the satellites are eclipsed by the earth. The problems associated with long-range communications drive all aspects of the communication system design, and strongly influences the size, weight, power, and cost of the hosting satellite.

Successful link closure between communicating satellites usually requires special hardware and processes to account for the time variation of the satellite-to-satellite geometry.

The determination of precise antenna pointing angles and rates, range monitoring, Doppler shift correction, acquisition and hand-off procedures are typical processes in achieving and maintaining satisfactory link closure. For example, when a VLEO satellite communicates with a constellation of HEO communications satellites, the link must be reestablished with a second HEO satellite before the currently-linked HEO satellite passes out of view of the VLEO satellite. The acquisition and hand-off to the second HEO satellite must be accomplished over extremely long ranges and in rapid fashion to avoid gaps in communications. For another example, a constellation may include several satellites distributed in multiple orbit planes (sometimes referred to as rings of co-planar satellites), each ring defined by the orbit altitude and the orientation of its orbit plane. The constellation may exhibit inter-ring and intra-ring crosslink communications creating time varying Doppler shifts in the received carrier frequency especially during intra-ring communications. The onboard communication subsystem is usually required to retransmit received range tones which can then be used to appropriately adjust the transmission for Doppler correction.

The rapidly changing relative geometry can be even more pronounced when communicating between two LEO satellites in different orbits and different orbit planes. At LEO, the severity of the relative geometry problem is largely dependent on the degree of alignment of the two orbit planes. When the planes of the orbits of two satellites are at a large angle to each other, the relative motion between the two satellites moving in their respective planes can be extremely large depending on the degree of planar misalignment. The two orbit planes are constantly rotating relative to the stars and relative to each other depending on the parameters of the two orbits. Even when the orbit planes are initially aligned, the orbit planes of unmatched orbits will slowly drift out of alignment due to the difference in their planar rotations. This well-known orbital perturbation effect that is caused by the earth's equatorial bulge is called nodal regression of the orbit plane, or the rotation of the orbit plane, relative to the stars, about the earth's polar axis. For LEO orbits, this rotational rate may be only a degree or two per day; however, in a relatively short time, it can result in severe misalignment of the planes of communicating LEO satellites with mismatched nodal regressions. The orbit plane rotational rate is a function of the orbit altitude and the inclination of the orbit plane. With proper selection of inclination, it is possible to match the nodal regression rates of two LEO orbits that are at different altitudes. The following equation would be used for calculating the correct inclination that results in matched nodal regression of circular orbits:

$$i_2 = \cos^{-1}\left[\left(\frac{RE + h_2}{RE + h_1}\right)^{3.5} \cdot \cos(i_1)\right]$$

where
$i_1$=inclination of orbit #1
$i_2$=inclination of orbit #2
$h_1$=altitude of orbit #1
$h_2$=altitude of orbit #2
RE=earth radius If the satellite's orbit has an inclination angle of 90°, the resulting nodal regression rate is zero and the matching orbit would also have a 90° inclination.

There are a growing number of existing and planned LEO constellations of communication satellites designed to provide a variety of mobile communication services to terrestrial users. These constellations, referred to as Big LEO satellite communication systems, consist of dozens (sometimes hundreds) of crosslinked satellites distributed uniformly about the globe in multiple planes or rings at a common altitude. In some cases, each ring may include dozens of satellites equally spaced along its circumference. Big LEO systems use large constellations of satellites to provide telecommunications services at fixed and graduated data rates for users on the ground. For example, the IRIDIUM system currently features 66 satellites distributed in six planes or rings and delivers low-data-rate mobile telephone service to subscribers in North America. For another example, Teledesic is a planned Big LEO system that will provide broadband (high-data-rate) global service suitable for rapid transmission of imagery and other very large data records. An early version of the planned Teledesic constellation called for 288 satellites uniformly distributed in 12 rings about the globe.

The need to provide uniform regional or global coverage with the fewest satellites drives the Big LEO orbits to the highest altitudes practical in the LEO range. (The earth's natural radiation environment constrains the upper bounds of the LEO altitudes.) Earth monitoring mission satellites, on the other hand, tend to fly at much lower (VLEO) altitudes in order to minimize sensor aperture (payload size and weight) needed to achieve the desired ground resolution. One or more VLEO mission satellites orbiting in the celestial presence of a Teledesic-like Big LEO system would suggest an architecture with multiple rings of Big LEO communication satellites criss-crossing aperiodically above the lower altitude mission satellites.

The problems faced by the mission satellite in delivering its data retrievals to a ground site are formidable. Many mission satellites today store the collected data onboard until they overfly the ground station, and then read out the data at an accelerated rate while the station remains in view. Store and dump operations as described require adequate onboard data storage capacity, and a sophisticated data read-out capability. These operations are also disadvantaged by inherent time delays between data collection and delivery. Other mission satellites today transmit large data records to the ground site, in real time, using a dedicated HEO relay satellite system. This operation requires long-range communication technologies involving precise pointing and tracking with large narrow beam antennas and high power transmitters; in addition, the cost of a dedicated HEO relay may be as much or more than the mission satellite. Communications between a LEO mission satellite and a non-co-orbital LEO communication satellite requires overcoming a myriad of problems dealing with the rapidly varying relative geometry and a high nonperiodic acquisition and hand-off frequency. These and other disadvantages are solved or reduced using the invention.

SUMMARY OF THE INVENTION

An object of the invention is to provide a method for communicating data from a very low earth orbit (VLEO) mission satellite through a radially directed communication crosslink to a low earth orbit (LEO) communication satellite.

Another object of the invention is to provide a method for communicating data between a LEO communication satellite and a VLEO mission satellite having an orbit with a nodal regression rate matched (equal) to the nodal regression rate of the orbit of the LEO communication satellite.

Another object of the invention is to provide a method for communicating data between a LEO communication satellite and a VLEO mission satellite having an orbit inclination selected to result in a nodal regression rate matched to that of the LEO communication satellite.

Yet another object of the invention is to provide a practical method for communicating data from a VLEO mission satellite to a planar ring of satellites which is part of a constellation of LEO communication satellites.

Still another object of the invention is to provide a method for communicating data from a VLEO mission satellite to a ring of LEO communication satellites with the orbit of the mission satellite having a stable relative nodal alignment with the ring of communication satellites but at a different altitude and thus having a different orbital period which causes the ring of LEO communication satellites to clock past the VLEO mission satellite with the VLEO satellite successively communicating data and handing off in turns as each of the LEO communication satellites passes into proximity of the VLEO mission satellite.

An additional object of the invention is to provide a method for improving the efficiency of communications between a VLEO mission satellite and an aligned ring of LEO communication satellites by incrementally varying the transmission data rate during the crosslinked communications to assure maximum data delivery compatible with the periodically varying transmission range and relative geometry.

A further object of the invention is to provide a practical method for radially crosslinking data from a VLEO mission satellite to a tangentially crosslinked constellation of LEO communication satellites which can relay the data to another location and radially downlink the data to a specified ground receiver.

The invention is a method for communicating collected data from a VLEO mission satellite to a LEO communication satellite that is a member of a constellation of interconnected communication satellites designed to service terrestrial users. The constellation of LEO communication satellites are deployed uniformly about the globe and distributed equally among one or more evenly spaced orbit rings or planes. The VLEO mission satellite is placed in orbit at a somewhat lower altitude, and has orbit parameters so selected to provide a nodal regression rate of its orbit plane matched to the nodal regression rate of the orbit planes of the LEO communication satellites. The matched nodal regression rates allows the orbit planes of the two satellite systems to maintain their relative initial alignment without further adjustment. If the mission satellite is inserted into an orbit plane that is nearly co-planar with one of the rings of the communication satellite constellation, that initial alignment of planes will naturally persist, keeping the VLEO mission satellite in time-varying proximity to one or more LEO communication satellites, and enabling convenient and continuous close-range communications through a radial satellite-to-satellite crosslink. The difference in altitudes of the two satellite systems results in a difference in orbit periods, with the lower mission satellite having a somewhat shorter period and thusly moving somewhat faster around its orbital ring. This difference in orbit periods causes the ring of LEO communication satellites to slowly clock past and overhead of the lower mission satellite. The short range radially crosslink from the VLEO mission satellite is sequentially closed with each succeeding LEO communication satellite in the aligned ring as its passes in proximity to the transmitting VLEO satellite.

Data collected by a VLEO mission satellite, such as an earth monitoring imaging satellite, can be communicated in real time to each successive LEO communication satellite as it comes into proximity to the transmitting VLEO satellite. Once collected data is communicated from the VLEO satellite to one of the LEO communication satellites in the aligned ring, the collected data can be tangentially relayed through crosslinks and then radially downlinked to a ground receiver. The wideband global connectivity of the constellation of LEO communication satellites provides continuous real time communication of the collected data from the VLEO mission satellite to any ground receiver in view of any of the LEO communication satellites.

The method matches nodal regression rates of the orbit planes of communicating satellites, and takes advantage of the difference in orbit altitudes of the VLEO mission satellite and the LEO constellation of communication satellites, and exploits the resulting satellite relative geometries to effect a number of significant implementation advantages that would improve communications performance, reduce mission satellite operations costs, and reduce design complexity and costs of mission satellite communications equipment.

The enduring alignment of orbit planes of the communicating satellites that is enabled by matched nodal regression rates results in slowly varying, well behaved, periodic and predictable relative geometry between the VLEO mission satellite and the LEO communication satellite closing the link. The range between the communicating satellites, the range rate, and the angular rates of satellite-to-satellite antenna pointing angles are all relatively small when compared to satellite-to-satellite geometry dynamics in general. This benign relative motion and close range and predictable geometry allow the mission satellite to use a wide beam antenna for open loop tracking and data transmission. The method advantageously may not require precision closed loop tracking for link closure, but rather, coarse open loop pointing may be used because the relative positions of each of the LEO communication satellites in the link-up sequence is known apriori with sufficient accuracy. Because of the short range, antenna pointing requirements are less severe, and the VLEO satellite may advantageously use lower power transmitters with a smaller antenna aperture. The VLEO satellite need not be burdened with high-capacity onboard data recorders because the method enables continuous real time communication of the collected data from the VLEO satellite to the LEO communication satellites. The communication method advantageously unburdens the design of the wideband data collecting mission satellite of many costly mission-specific features including high capacity data recorders, sophisticated high-data-rate downlinks, high power transmitters, large aperture narrow beam crosslink antennas with precise pointing and tracking capability, and possibly a dedicated wideband satellite-borne data relay service. All of these elements drive up the size, weight, power, and design complexity of the mission satellite system. The communications method thusly provides significant potential for mission system cost reduction.

The communication method provides a means for a space-based user to conveniently "plug-in" to a space-based wideband telecommunications system designed to service mobile ground-based users. One example of such a commercial wideband capability is the Gigalink Satellite Link and the Inter-satellite Link featured in a proposed design of the Teledesic Communications System.

The communications method enables a VLEO earth monitoring mission satellites to conveniently crosslink wideband data in real time to broadband LEO commercial satellites designed to service terrestrial users. Orbits of the VLEO data collecting mission satellites are tailored to achieve and maintain short range and simple geometry relative to the LEO communication satellites eliminating the need for precision antenna pointing and tracking. The preferred LEO commercial communication satellite constellation high-data-rate connectivity would be used to radially crosslink receive, tangentially crosslink relay and downlink mission data and telemetry to mission ground stations and other terrestrial receivers for processing and dissemination. Processed information may then be routed to users worldwide via standard commercial or special application broadband space and terrestrial assets.

Two factors influence the resulting satellite-to-satellite geometry exploited by the communications method are the number of communication satellites in each ring which determines their angular spacing, and the inclination angle of the Big LEO orbits which affects the degree of co-planarity of the aligned orbit planes of the mission satellite and the selected ring of communication satellites. The method is more compatible with larger number of communication satellites per ring and with higher inclined orbits. An early version of the proposed Teledesic design called for a constellation of 288 satellites in highly inclined orbits with 24 satellites in each of 12 rings. The proposed Teledesic system may be a preferred constellation that can readily take advantage of the communications method.

However, the communications method is also a viable concept when applied to much smaller LEO constellations and to orbits with lower inclinations, and, with minor operational constraints on link closure duty cycles, may well outperform available alternatives for these applications. The advantages of short range link closure, and the savings gleaned from unburdening the mission satellite system of several mission specific, high cost communications features will become more apparent from the following detailed description of the preferred embodiment.

DETAILED DESCRIPTION OF THE PREFERRED EMBODIMENT

The communication method provides a means of favorably constraining the variation in the relative geometry of satellites in low earth orbit (LEO) in order to facilitate their cooperative interaction, for example, satellite-to-satellite communications. The method applies preferably to low altitude data collecting mission satellites and their interaction with proposed constellations of LEO communication satellites designed specifically to provide mobile satellite communication services to terrestrial users. These large multi-satellite systems are often referred to as Big LEO systems. The method enables collected data from a mission satellite to be transmitted conveniently to the Big LEO satellites in a manner similar to that of a user on the ground. The transmitted data is then relayed to one or more ground sites for processing and dissemination using the wideband connectivity of the Big LEO constellation as if the transmitted data was a typical commercial message. The communication method is useful for servicing users of the collected data. By enabling the mission satellite to plug in to the Big LEO system, the method eliminates the need for a dedicated data communication capability and provides a low-cost means for the mission satellite system to continuously deliver real time data to the ground.

Figure 1:
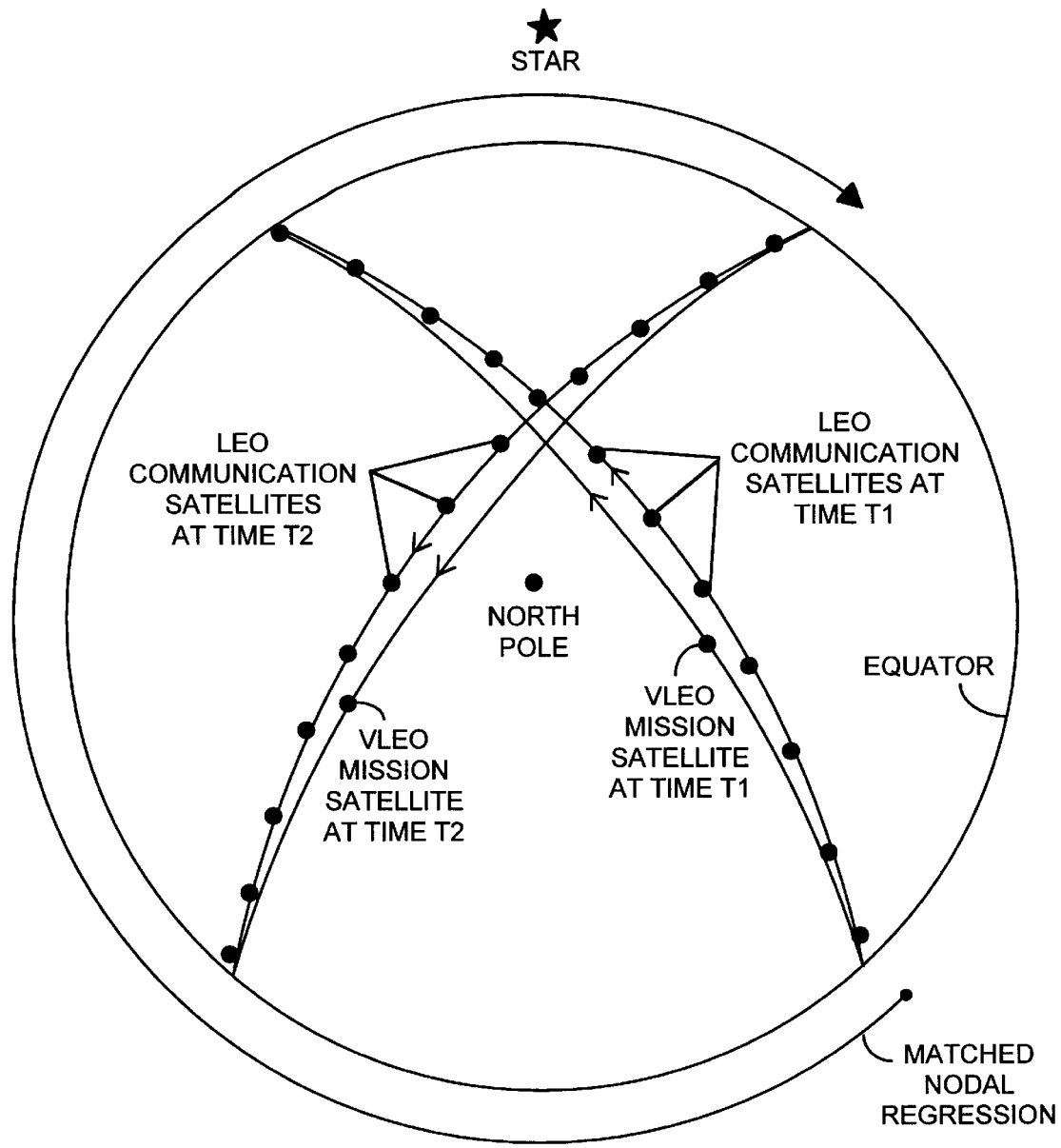
FIG. 1 is a polar view of the earth showing alignment of the planes of a very low earth orbit (VLEO) mission satellite and a ring of low earth orbit (LEO) communication satellites.

An embodiment of the invention is described with reference to the Figures. A Big LEO constellation typically has a plurality of circular rings of satellites uniformly spaced around the equator, and at equal orbit altitudes and inclinations, with each plane or ring containing several satellites with uniform angular spacing around the ring. For illustrative purposes, FIG. 1 shows a polar view of only one ring of satellites from a Big LEO constellation. The ring is shown at time T1 and the same ring is shown again some time later at T2, during which time the orbit plane has experienced appreciable nodal regression. Nodal regression refers to the rotation of the orbit plane about the earth's polar axis measured relative to the stars. The figure also shows a VLEO mission orbit at time T1 with its orbit plane initially aligned with the plane of a Big LEO ring. The orbit parameters of the mission satellite have been selected to result in a nodal regression rate equal to that of the Big LEO ring, and the initial alignment of the two orbit planes that was established at T1 is continually maintained with no further adjustment as indicated at time T2. For illustration, the communication satellites are in highly inclined circular orbits at a given altitude, for example, 1350 km. The altitude of the mission satellite is somewhat lower, for example, 560 km.

Figure 2:
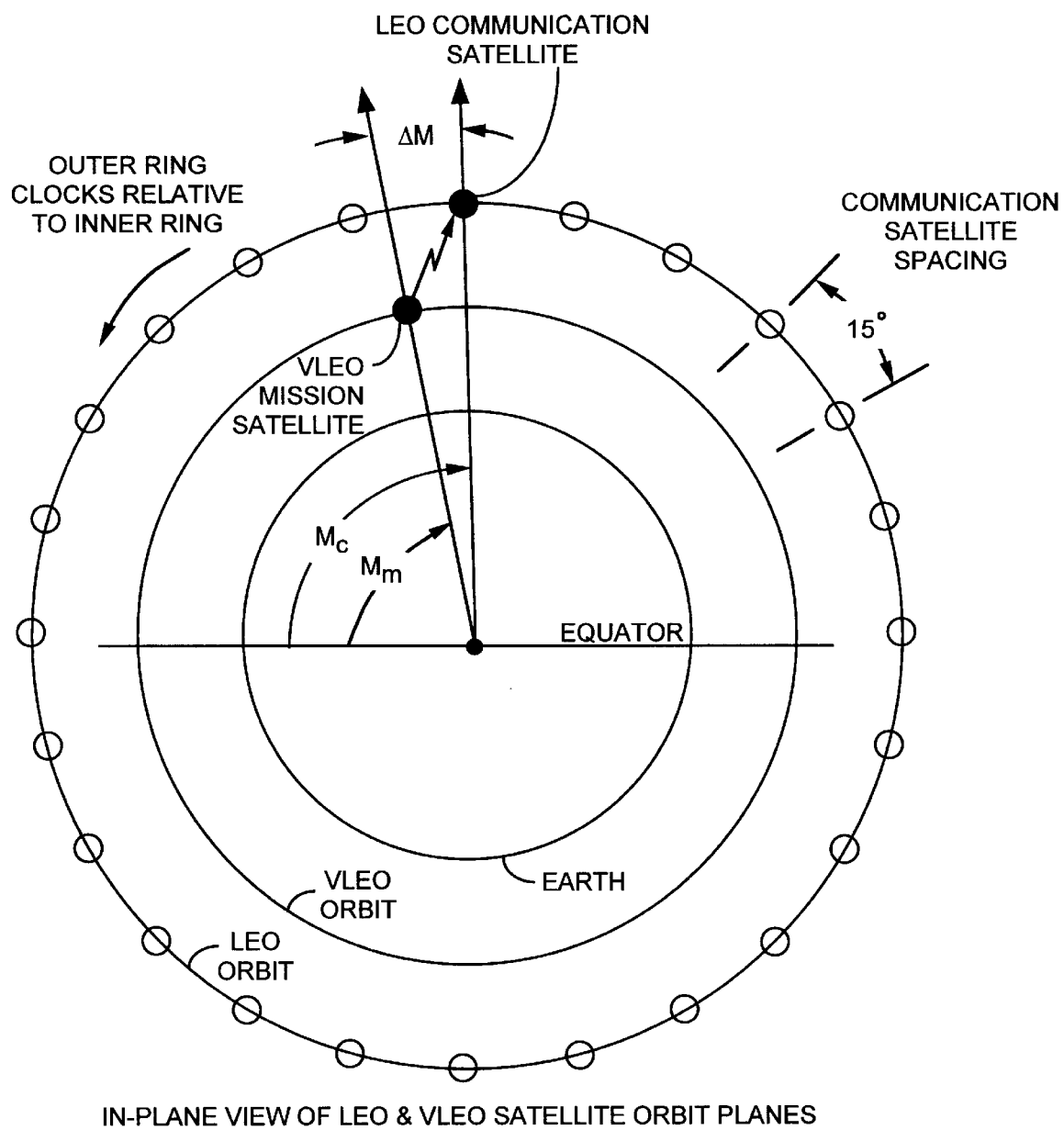
FIG. 2 is an in-plane view of the VLEO and LEO orbits illustrated in FIG. 1.
Figure 3:
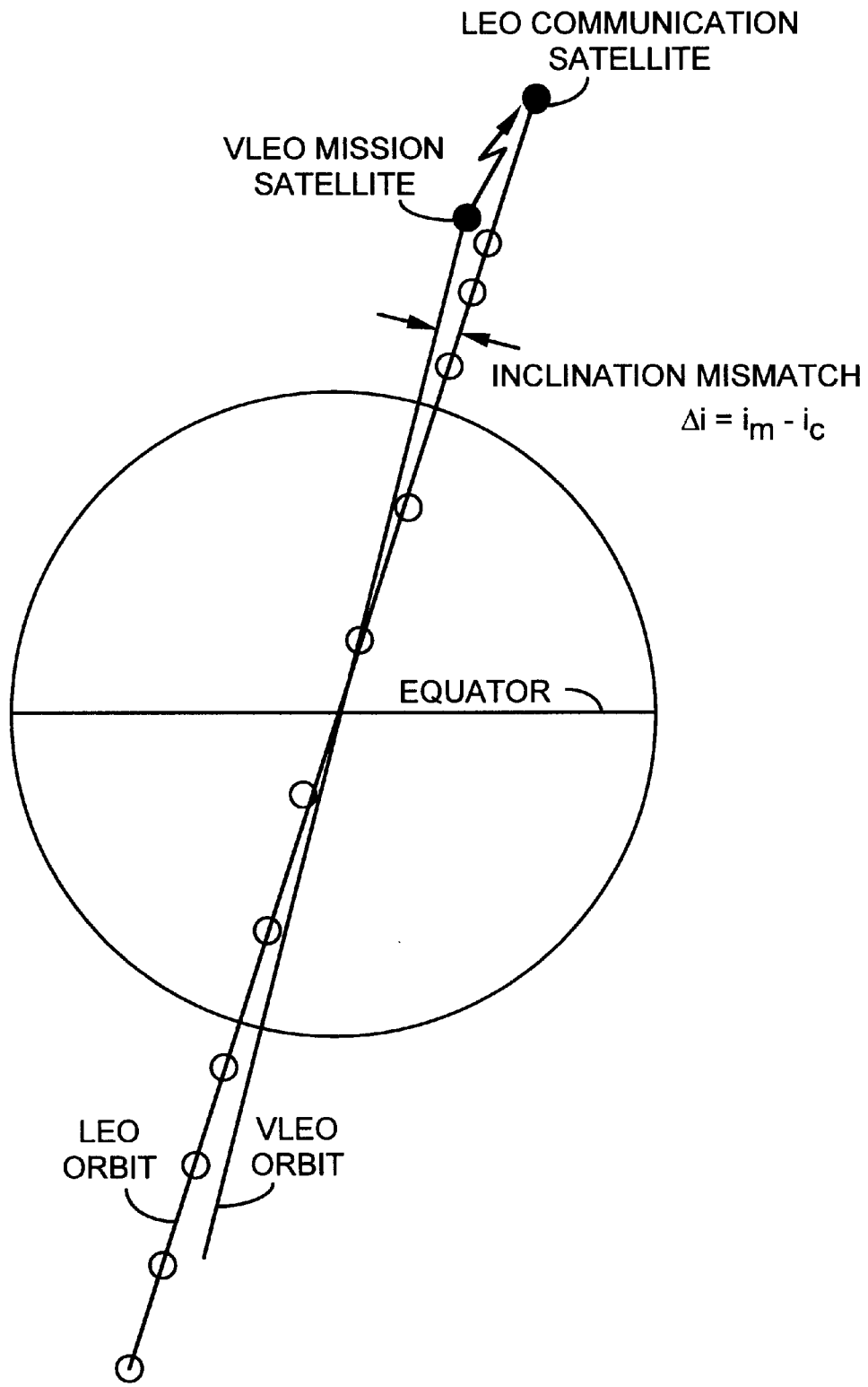
FIG. 3 is an edge view of the VLEO and LEO orbit planes depicting a difference in inclination angles.
Figure 4:
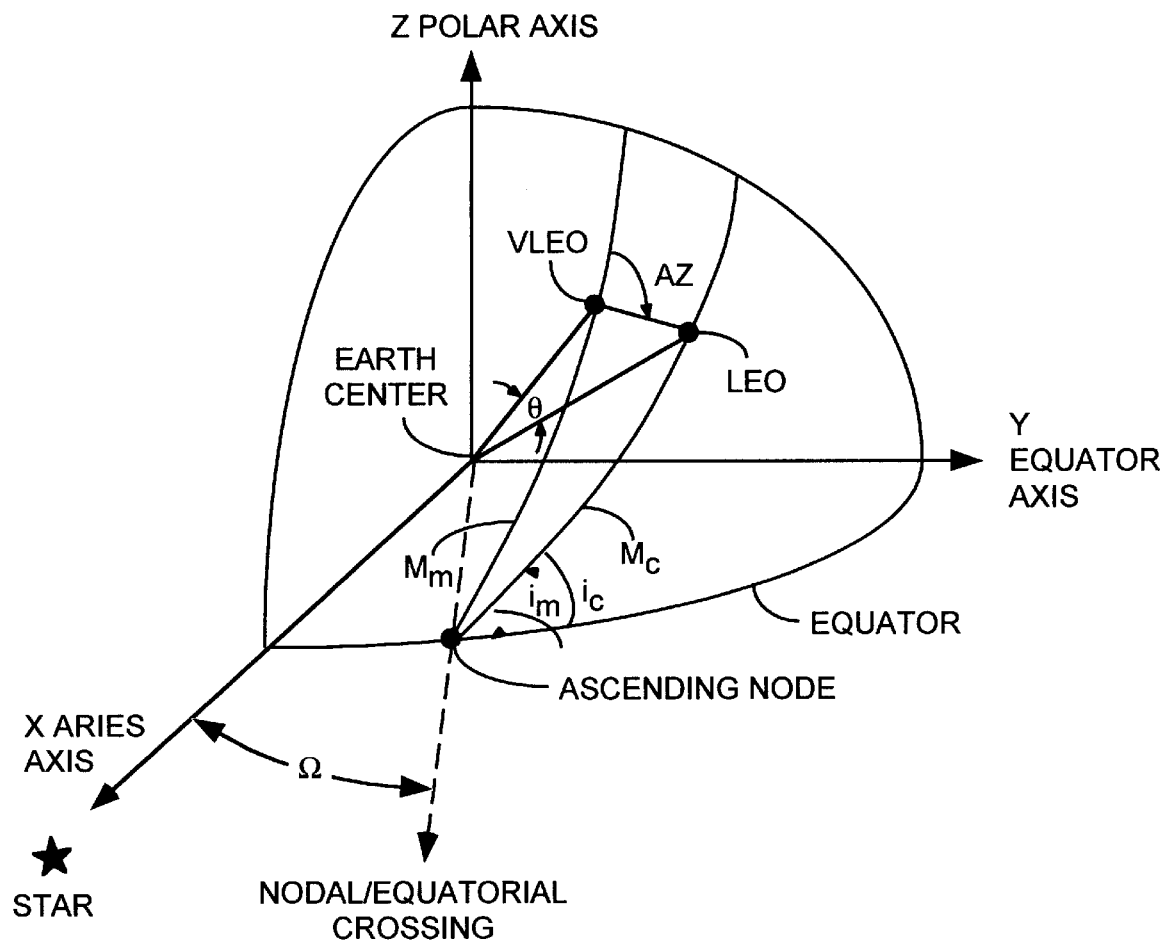
FIG. 4 shows the VLEO and LEO orbits described in an earth centered coordinate system.

Referring to FIGS. 1 through 3, FIG. 2 shows an in-plane view of the exemplary ring of 24 equally-spaced LEO communication satellites, and the aligned orbit of the VLEO mission satellite. The difference in altitudes of the two orbits results in a difference in orbit periods which causes the mission satellite to move around its orbit at a slightly faster rate. A hypothetical cosmonaut onboard the mission satellite would observe a continuous parade of LEO communication satellites slowly passing by overhead as the mission satellite overtakes them one by one. The exemplary altitudes previously stated would result in a 26 minute spacing between communication satellite passes. If the mission satellite was linking data up to the ring of communication satellites, the link would be handed off to each succeeding communication satellite at 26.5 minute intervals. Fewer satellites in the ring of communication satellites would result in longer intervals between hand-offs with less favorable geometry during the hand-off operation.

FIG. 3 is an edge view of the orbit plane of the ring of LEO communication satellites and the orbit plane of the mission satellite. FIG. 3 illustrates the resulting difference in inclination angles that is required to match the nodal regression rates of the two orbits having different altitudes. This difference in inclination angle results in an out-of-plane component in the satellite relative geometry that must be accounted for in the calculation of antenna pointing angles. The out-of-plane component is maximum at extreme latitudes, and zero at the equator.

Referring to FIGS. 1 through 6, every satellite orbit is defined by a six-element parameter set which establishes the path of the satellite, and the state of the satellite along the path at a particular instant. Once these parameters are known at any given point in time, the position of the satellite can be computed at any other time thereafter. For circular orbits, which is the preferred form of the invention, the important non-zero orbital elements include "r" the radius of the orbit measured from the earth's center, "i" the inclination angle of the orbit plane, "Ω" the right ascension of the ascending node which establishes the instantaneous angular position of the orbit plane with respect to the stars, and "M" the mean anomaly angle that defines the instantaneous angular position of the satellite around its orbit measured from the equator. These elements are illustrated graphically in FIG. 4 which depicts the circular orbits of the LEO communication satellites and the VLEO mission using a typical earth centered triad reference system. The orbit plane of the VLEO mission satellite is depicted as being initially aligned with the orbit plane of the preferred ring of communication satellites. Those skilled in the art know how to deploy a mission satellite in a predetermined orbit with specified parameters and orbit plane orientation. Selection of the appropriate radius and inclination parameters for the VLEO mission satellite orbit will result in a nodal regression rate matched to that of LEO communication satellites, and will assure continued alignment of the two orbit planes with no need for further adjustment.

Referring again to FIG. 4, the mission satellite mean anomaly Mm defines the position of the mission satellite along its orbital ring, and the communication satellite mean anomaly Mc defines the similar orbital position of the communication satellite to which the mission satellite is transmitting. ΔM is the difference in mean anomalies, expressed as Mc−Mm, and defines how far ahead or behind the communication satellite is relative to the mission satellite. Δi is the difference between im and ic. The satellite positions in their respective orbits define the azimuth angle AZ of the range vector from the mission satellite to the communication satellite. The satellite positions also define their respective earth centered radius vectors and the earth central angle θ between the radius vectors rc and rm.

Figure 5:
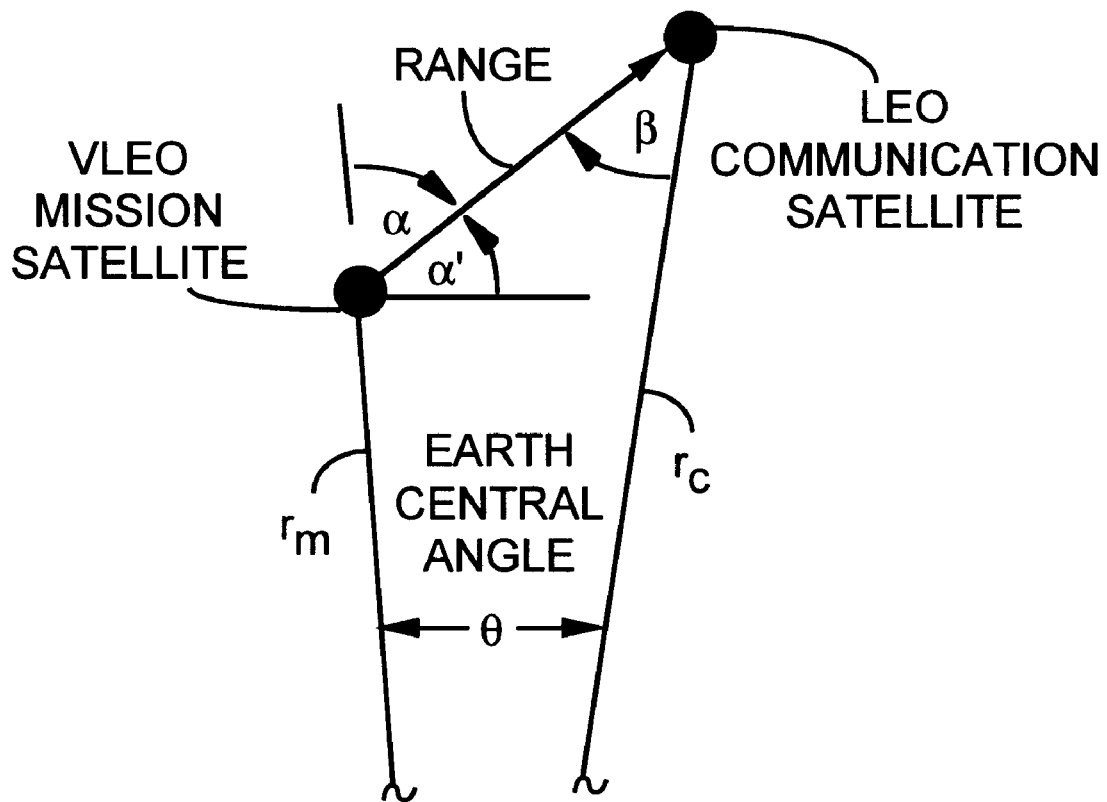
FIG. 5 shows satellite relative geometry and antenna pointing angles.

FIG. 5 is a view of the communicating satellites in the plane formed by the radius vectors, rm and rc. This geometry defines the depression angles α of the range vector emanating from the mission satellite to the communication satellite, as well as the communication satellite off nadir angle A. Together AZ and α determine the required angular direction of the boresight of the transmitting antenna onboard the mission satellite. The values of AZ and α are readily calculated using conventional algorithms.

Being at a lower altitude, the VLEO satellite will have an orbit period shorter than that of the Big LEO communication satellites. This will cause the outer ring of the LEO communication satellites to clock, that is, rotate in the plane relative to the aligned mission satellite, so that the communication satellites overfly the mission satellite in continuous succession, one after another. The difference in orbit altitudes in the exemplar form results in an in-plane rotation of the outer ring relative to the inner ring of approximately 34 degrees per hour. Thus, a LEO communication satellite will pass overhead the mission satellite every 26 minutes. By hand-off switching from one communication satellite to the next at predetermined time periods corresponding to specified ΔM intervals, the mission satellite maintains a periodic and predictable crosslink geometry. The pointing of the crosslink antenna of the mission satellite could be controlled open-loop by a simple clock which times the successive overhead passages of LEO communication satellites. There are several options for closing the link between the mission satellite and the Big LEO communication satellite. The simplest approach would be to position a body-fixed antenna at the optimum off-zenith angle on the mission satellite, and close the link each time a communication satellite passes through the beam. However, limitations on beamwidths compatible with wideband communication would probably result in periodic outages. Multiple fixed antennas with tailored beams would improve the closure duty cycle.

The method prefers an architecture featuring VLEO mission satellites such as one or more earth monitoring satellites, orbiting below a constellation of Big LEO communication satellites designed to service terrestrial users. The orbit plane of the mission satellite is aligned with a ring of the Big LEO constellation, and the orbit parameters of the mission satellite are selected to achieve a matched nodal regression rate so the original alignment is maintained. The method exploits the predictable and benign nature of the resulting relative geometries of the VLEO and LEO satellites. The favorable close range of the communicating satellites, in the order of 1000 km, reduces requirements for high pointing accuracy. The mission satellite may use a clock-driven phased array antenna or a clock-driven gimballed parabolic antenna to keep the crosslink beam focused on the receiving communication satellite. The geometry clock would simply step the antenna boresight through prescribed increments of the excursion arc of the receiving communication satellite as it passed overhead. When the receiving communication satellite reaches a pre-set angular excursion limit ΔMh relative to the VLEO mission satellite, the antenna beam is repositioned to link up with the next receiving communication satellite in line. Using this approach, continuous closure of the wideband link is maintained without the requirement for more precise tracking and antenna pointing capabilities.

If the parameters of the mission orbit are selected so that the orbit plane has the same nodal regression rate as a plane of communication LEO satellites, the two planes can be initially aligned, and that alignment can be continually maintained with little or no further adjustment. The resulting relative geometry is described by a ring of equally-spaced LEO communication satellites passing at precise intervals, one after another, overhead the transmitting mission satellite. The relative geometry is predictable and well behaved, that is, the relative geometry changes slowly, which is convenient for antenna pointing. The periodic and slowly varying dynamics of the relative geometry are significant features of the communication method. The mission satellite interfaces only with the ring of Big LEO satellites in the aligned plane. Once the mission data has been received, it can be relayed through the crosslinks of any of the communication satellites in the Big LEO constellation, in any plane, like any other communication message.

The communication method enables link closure using predetermined open loop antenna pointing sequences and provides continuous real-time data transmission. However, in some applications, it may prove advantageous to have the LEO communication satellites in the aligned plane emit a low-power pilot tone at a selected frequency to enable the mission satellite to execute an efficient acquisition. If the communication LEO satellites should add such a feature to accommodate the mission satellites, only the LEO communication satellites in the aligned ring are affected. For some orbits, it may be advantageous to transmit data only at discrete orbital positions or at certain relative positions of the communicating satellites when geometries are most favorable. In such a situation, interim data could be recorded onboard the mission satellite for later transmission.

The receiving antenna on a Big LEO communication satellite is typically a phased array antenna. The beam that emanates from a phased array antenna is electronically steered by changing the relative phase of adjacent elements forming the array. Such an antenna features high agility with no moving parts. However, as the beam is electronically pointed away from its normal direction, the efficiency decreases. There is a practical limit on how far from the normal direction the beam can be pointed. As applied to the communication method, the communication geometry and range are most favorable when the mission satellite is directly below the LEO communication satellite. As this relative geometry changes, communications gradually deteriorate, and the ability to transmit at maximum data rates becomes more marginal. The worst case geometry occurs when the mission satellite is midway between adjacent LEO communication satellites at the end and beginning of the overhead excursion arc. At this instant, the difference in mean anomalies of the communicating satellite's ($\Delta M$) equals $\Delta Mh$ triggering an immediate hand-off to the next communication satellite in line. As the number of Big LEO satellites in each ring increases, their relative spacing decreases, and the worst case geometry for continuous mission satellite communications improves.

Figure 6:
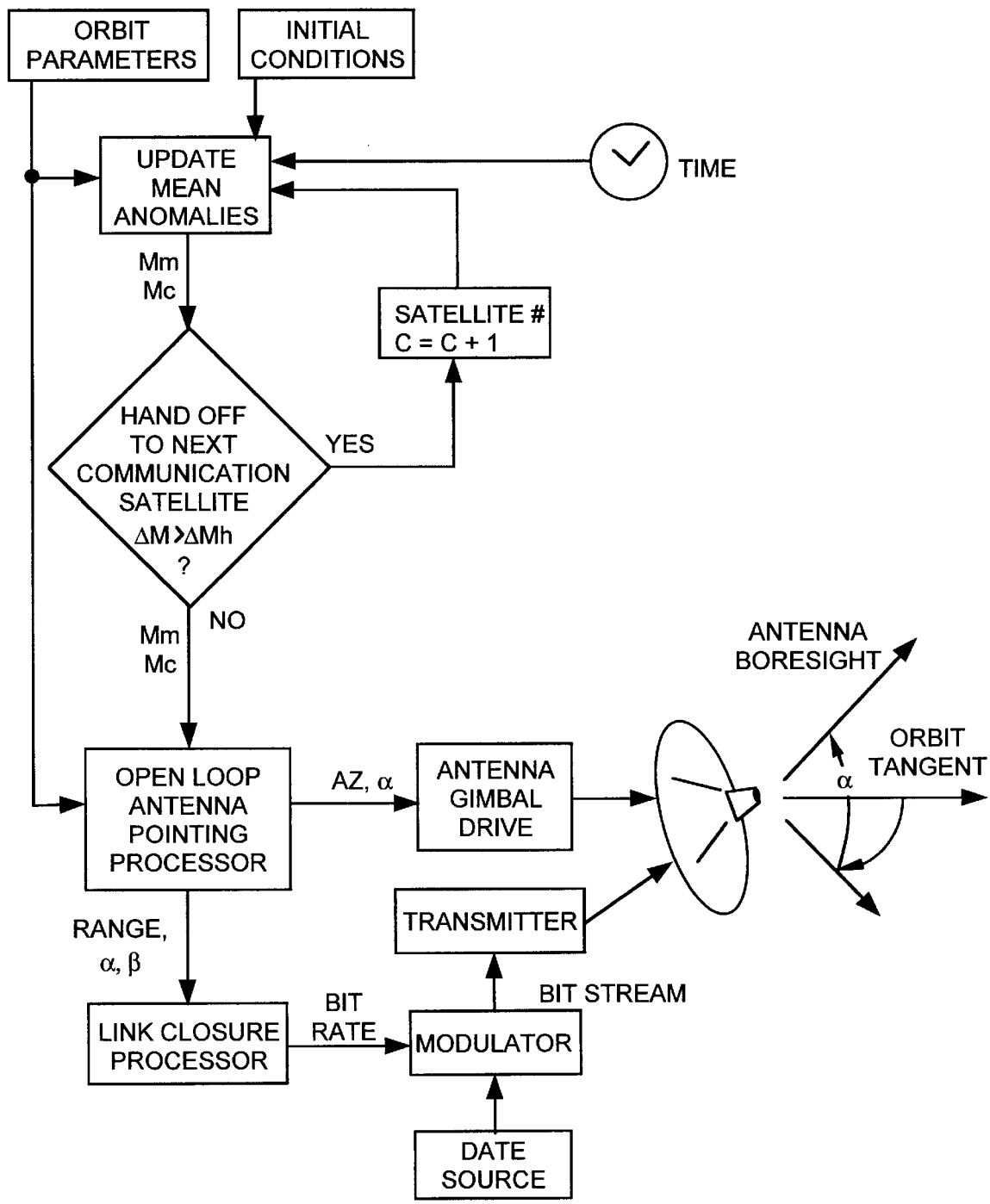
FIG. 6 is a flow diagram of an antenna pointing and link closure processes.

The communication method can be described with reference to FIG. 6. The diagram applies to a cooperating ring of communication satellites C in a Big LEO constellation and a crosslinking VLEO mission satellite. All satellites are in known circular orbits. The VLEO mission satellite is at a lower altitude with a correspondingly different inclination preselected to result in a nodal regression rate matched to that of the Big LEO ring. The orbit of the mission satellite is established so that its orbit plane is initially aligned with the plane of the ring of Big LEO satellites. The matched nodal regression rates will assure continued alignment of the orbit planes. The difference in orbit periods will cause the ring of Big LEO satellites to rotate in the plane and slowly parade by overhead relative to the mission satellite. Satellite orbit parameters and initial conditions are used to calculate the relative positions of the satellites and generates pointing angles for the mission satellite antenna to initiate transmission to an overhead communication satellite. The mean anomalies of the communicating satellites are continually updated and compared, and the antenna boresight is continually repositioned to track the predictable overhead path of the communication satellite. When the difference in mean anomalies ($\Delta M$) reaches a prescribed maximum ($\Delta Mh$), the antenna pointing processor is signaled that the communication satellite has reached the extreme of its excursion arc above the mission satellite, and the antenna is repositioned to close the link with the next communication satellite in line. As the hand-off is initiated, the mean anomaly value MC is appropriately reset to reflect the position of the next communication satellite in the sequence, and the mission satellite antenna begins tracking that satellite through its excursion arc. The tracking and hand-off sequence continues, one after the other, enabling continuous close-range communications between the VLEO mission satellite and the LEO communication satellites. The relatively close range enables open loop tracking using a preferred wide beam antenna of small aperture. As the antenna aperture is decreased, the antenna beam becomes wider and more compatible with less precise open loop pointing and tracking. As the antenna aperture is increased, the antenna becomes narrower and the transmitted power becomes more focused and may require closed loop precision pointing and tracking. The communication method takes advantage of the resulting short range and placid geometry dynamics, and may preferably use small antenna apertures, of the order of six inches, with open loop pointing and tracking.

The link closure processor uses the calculated range and relative geometry of the communicating satellites, along with transmitter and receiver design characteristics, to compute the available link margin and the corresponding maximum allowable data rate, that is, the highest transmission rate in terms of bits per second (bps) consistent with a pre-established minimum link margin. Hence, the link closure processor continually monitors those parameters affecting the available link margin and incrementally adjusts transmission rates in a somewhat cyclic fashion as the communication satellites pass overhead the transmitting mission satellite. As a result, data rates are maintained at near maximum and transmission efficiency is enhanced.

An exemplary satellite communication method is described in reference to a computer simulation readout presented in the following LINK CLOSURE TABLE. The example is for a Big LEO communication system comprising a constellation of 288 satellites uniformly distributed in 12 orbit planes, with 288/12 equaling 24 satellites in each planar ring, with 360°/24 equaling a 15° satellite angular spacing around each ring, at a circular orbit altitude of 1370 km, with an orbit inclination equaling 85°, with an orbit period equaling 112.97 minutes, and with a mean anomaly rate, that is mean motion, equaling 360° per 112.97 minutes that is equal to 3.19° per minute. The VLEO data collection mission satellite is in a circular orbit at an altitude equaling 560 km, with an orbit period equaling to 95.71 minutes, with a mean anomaly rate equaling 360°/95.71 min or 3.76°/min. The inclination angle of the mission satellite orbit is set at 86.600°, which results in a nodal regression rate of the orbit plane equal to that of the orbit planes of the Big LEO constellation. The mission satellite is inserted into orbit so that its orbit plane is aligned with one of the Big LEO rings. The relative mean anomaly rate between the mission satellite and the Big LEO satellite is equal to 3.76°/min minus 3.19°/min or 0.57°/min. Thus the time spent linked to each communication satellite as it passes overhead the mission satellite is equal to 15°/0.57 deg per min or 26.3 minutes. The link closure specifications include a crosslink antenna aperture on the mission satellite equaling 0.5 ft, a pointing accuracy equaling 1.25°, with transmitter power equaling 10 watts, and a carrier frequency equaling 30 GHz, resulting in a crosslink beamwidth of 5°. Communication satellite receiver characteristics include a Gain/Temperature (G/T) performance parameter equaling 6.0 dB, an energy per bit/noise density (Eb/No) equaling 9.6 dB, with combined circuit, polarity, and implementation losses equaling 5.5 dB, and with a minimum required link margin of 1 dB. At time zero, the mean anomalies of the mission satellite (Mm) and the first communication satellite (Mc, c=1) are equal to zero, that is, both satellites simultaneously cross the equator, arbitrarily at zero longitude, at time equal to zero.

The link closure history is calculated and printed out by computer simulation, as a well known practice in the art. Definition of printed columns are that: TIME is the time in minutes; SAT is the identification number of the communication satellite currently closing the link; LAT is the latitude of the mission satellite in degrees; LON is the longitude of the mission satellite in degrees; DELMA is the mean anomaly of the active communication satellite minus mean anomaly of mission satellite in degrees; AZ is the azimuth of mission satellite crosslink antenna boresight in degrees; ALFA is the off-zenith angle of the mission satellite antenna boresight in degrees; RANGE is the distance between the mission satellite and the link closing communication satellite in kilometers; BETA is the off-nadir angle of the phased array receiving antenna of the active communication satellite in degrees; LM is the link margin in dB assuming a constant data rate of 50 megabits per second (Mbps) (LM varies with range and geometry); and MAXDR is the maximum allowable data rate in Mbps at the minimum required link margin. The Link Closure Table shows results in one minute increments.

LINK CLOSURE TABLE

| TIME (Min) | SAT | LAT (Deg) | LON (Deg) | DELMA (Deg) | AZ (Deg) | ALFA (Deg) | RANGE (Km) | BETA (Deg) | LM (dB) | MAXDR (Mbps) |
|---|---|---|---|---|---|---|---|---|---|---|
| 0. | 1 | 0.00 | 0.00 | 0.00 | 0.00 | 0.00 | 810. | 0.00 | 6.88 | 194. |
| 1. | 1 | 3.75 | 359.97 | −0.57 | 171.17 | 5.56 | 813. | 4.97 | 6.82 | 191. |
| 2. | 1 | 7.51 | 359.95 | −1.15 | 171.23 | 11.02 | 824. | 9.86 | 6.64 | 183. |
| 3. | 1 | 11.26 | 359.93 | −1.72 | 171.27 | 16.32 | 840. | 14.57 | 6.35 | 171. |
| 4. | 1 | 15.02 | 359.91 | −2.30 | 171.30 | 21.39 | 863. | 19.06 | 5.96 | 157. |
| 5. | 1 | 18.77 | 359.90 | −2.87 | 171.33 | 26.18 | 891. | 23.27 | 5.49 | 141. |
| 6. | 1 | 22.53 | 359.91 | −3.45 | 171.37 | 30.67 | 925. | 27.17 | 4.96 | 125. |
| 7. | 1 | 26.28 | 359.92 | −4.02 | 171.43 | 34.84 | 963. | 30.76 | 4.39 | 109. |
| 8. | 1 | 30.03 | 359.96 | −4.60 | 171.49 | 38.70 | 1005. | 34.04 | 3.78 | 95. |
| 9. | 1 | 33.78 | 0.02 | −5.17 | 171.56 | 42.26 | 1051. | 37.02 | 3.15 | 82. |
| 10. | 1 | 37.54 | 0.11 | −5.75 | 171.64 | 45.54 | 1099. | 39.72 | 2.51 | 71. |
| 11. | 1 | 41.29 | 0.23 | −6.32 | 171.73 | 48.55 | 1151. | 42.15 | 1.88 | 61. |
| 12. | 1 | 45.04 | 0.40 | −6.90 | 171.82 | 51.32 | 1204. | 44.35 | 1.25 | 53. |
| 13. | 1 | 48.78 | 0.63 | −7.47 | 171.92 | 53.88 | 1260. | 46.32 | 0.63 | 46. |
| 14. | 2 | 52.53 | 0.93 | 6.95 | 11.27 | 51.79 | 1214. | 44.71 | 1.14 | 52. |
| 15. | 2 | 56.27 | 1.34 | 6.38 | 12.62 | 49.18 | 1162. | 42.66 | 1.74 | 59. |
| 16. | 2 | 60.01 | 1.89 | 5.80 | 14.18 | 46.38 | 1113. | 40.41 | 2.34 | 68. |
| 17. | 2 | 63.74 | 2.65 | 5.23 | 16.00 | 43.38 | 1067. | 37.95 | 2.94 | 78. |
| 18. | 2 | 67.46 | 3.71 | 4.66 | 18.18 | 40.17 | 1023. | 35.28 | 3.53 | 89. |
| 19. | 2 | 71.17 | 5.26 | 4.08 | 20.84 | 36.76 | 983. | 32.40 | 4.09 | 102. |
| 20. | 2 | 74.85 | 7.66 | 3.51 | 24.16 | 33.16 | 947. | 29.32 | 4.63 | 115. |
| 21. | 2 | 78.48 | 11.68 | 2.93 | 28.43 | 29.42 | 915. | 26.09 | 5.12 | 129. |
| 22. | 2 | 82.00 | 19.47 | 2.36 | 34.12 | 25.62 | 888. | 22.78 | 5.55 | 143. |
| 23. | 2 | 85.13 | 38.44 | 1.78 | 41.94 | 21.92 | 866. | 19.53 | 5.91 | 155. |
| 24. | 2 | 86.59 | 88.57 | 1.21 | 52.96 | 18.58 | 850. | 16.57 | 6.19 | 165. |
| 25. | 2 | 84.73 | 133.67 | 0.63 | 68.33 | 16.03 | 839. | 14.32 | 6.37 | 172. |
| 26. | 2 | 81.50 | 150.05 | 0.06 | 87.82 | 14.87 | 835. | 13.28 | 6.44 | 175. |
| 27. | 2 | 77.96 | 157.05 | −0.52 | 108.10 | 15.46 | 837. | 13.81 | 6.40 | 173. |
| 28. | 2 | 74.32 | 160.76 | −1.09 | 125.02 | 17.61 | 845. | 15.72 | 6.26 | 168. |
| 29. | 2 | 70.63 | 162.99 | −1.67 | 137.40 | 20.75 | 860. | 18.49 | 6.01 | 159. |
| 30. | 2 | 66.92 | 164.46 | −2.24 | 146.15 | 24.38 | 880. | 21.69 | 5.68 | 147. |
| 31. | 2 | 63.20 | 165.47 | −2.82 | 152.45 | 28.18 | 905. | 25.01 | 5.27 | 134. |
| 32. | 2 | 59.46 | 166.19 | −3.39 | 157.12 | 31.96 | 936. | 28.29 | 4.79 | 120. |
| 33. | 2 | 55.73 | 166.72 | −3.97 | 160.71 | 35.62 | 971. | 31.43 | 4.27 | 106. |
| 34. | 2 | 51.98 | 167.11 | −4.54 | 163.54 | 39.12 | 1010. | 34.39 | 3.71 | 93. |
| 35. | 2 | 48.24 | 167.40 | −5.12 | 165.84 | 42.41 | 1053. | 37.15 | 3.12 | 82. |
| 36. | 2 | 44.49 | 167.62 | −5.69 | 167.75 | 45.49 | 1099. | 39.68 | 2.52 | 71. |
| 37. | 2 | 40.74 | 167.78 | −6.26 | 169.36 | 48.37 | 1147. | 42.01 | 1.92 | 62. |
| 38. | 2 | 36.99 | 167.90 | −6.84 | 170.75 | 51.05 | 1199. | 44.13 | 1.31 | 54. |
| 39. | 2 | 33.24 | 167.98 | −7.41 | 171.95 | 53.54 | 1252. | 46.06 | 0.71 | 47. |
| 40. | 3 | 29.49 | 168.04 | 7.01 | 5.00 | 51.63 | 1211. | 44.59 | 1.17 | 52. |
| 41. | 3 | 25.73 | 168.07 | 6.44 | 4.71 | 48.88 | 1157. | 42.42 | 1.81 | 60. |
| 42. | 3 | 21.98 | 168.08 | 5.86 | 4.35 | 45.89 | 1105. | 40.01 | 2.44 | 70. |
| 43. | 3 | 18.23 | 168.09 | 5.29 | 3.89 | 42.65 | 1056. | 37.34 | 3.08 | 81. |
| 44. | 3 | 14.47 | 168.08 | 4.71 | 3.30 | 39.12 | 1010. | 34.40 | 3.71 | 93. |
| 45. | 3 | 10.72 | 168.06 | 4.14 | 2.55 | 35.31 | 968. | 31.16 | 4.32 | 107. |
| 46. | 3 | 6.96 | 168.04 | 3.56 | 1.54 | 31.19 | 929. | 27.63 | 4.90 | 123. |
| 47. | 3 | 3.21 | 168.01 | 2.99 | 0.07 | 26.78 | 896. | 23.79 | 5.43 | 139. |
| 48. | 3 | −0.55 | 167.99 | 2.41 | 2.18 | 22.09 | 867. | 19.68 | 5.90 | 154. |
| 49. | 3 | −4.30 | 167.96 | 1.84 | 5.34 | 17.17 | 844. | 15.33 | 6.29 | 169. |
| 50. | 3 | −8.05 | 167.93 | 1.26 | 11.63 | 12.14 | 827. | 10.85 | 6.59 | 181. |
| 51. | 3 | −11.81 | 167.91 | 0.69 | 26.85 | 7.30 | 816. | 6.53 | 6.77 | 189. |
| 52. | 3 | −15.56 | 167.90 | 0.11 | 75.91 | 4.26 | 812. | 3.81 | 6.84 | 192. |
| 53. | 3 | −19.32 | 167.89 | −0.46 | 132.05 | 6.64 | 815. | 5.94 | 6.79 | 190. |
| 54. | 3 | −23.07 | 167.90 | −1.03 | 150.02 | 11.37 | 824. | 10.17 | 6.62 | 182. |
| 55. | 3 | −26.82 | 167.92 | −1.61 | 157.12 | 16.39 | 841. | 14.64 | 6.34 | 171. |
| 56. | 3 | −30.58 | 167.96 | −2.18 | 160.83 | 21.32 | 863. | 19.00 | 5.97 | 157. |
| 57. | 3 | −34.33 | 168.02 | −2.76 | 163.13 | 26.03 | 890. | 23.13 | 5.51 | 141. |
| 58. | 3 | −38.08 | 168.11 | −3.33 | 164.71 | 30.46 | 923. | 26.99 | 4.99 | 125. |
| 59. | 3 | −41.83 | 168.24 | −3.91 | 165.88 | 34.60 | 961. | 30.56 | 4.42 | 110. |
| 60. | 3 | −45.58 | 168.42 | −4.48 | 166.79 | 38.44 | 1002. | 33.82 | 3.82 | 96. |
| 61. | 3 | −49.33 | 168.65 | −5.06 | 167.53 | 41.98 | 1047. | 36.79 | 3.20 | 83. |
| 62. | 3 | −53.07 | 168.97 | −5.63 | 168.16 | 45.25 | 1095. | 39.48 | 2.57 | 72. |
| 63. | 3 | −56.81 | 169.40 | −6.21 | 168.71 | 48.26 | 1146. | 41.92 | 1.94 | 62. |
| 64. | 3 | −60.55 | 169.98 | −6.78 | 169.19 | 51.03 | 1198. | 44.12 | 1.32 | 54. |
| 65. | 3 | −64.28 | 170.77 | −7.36 | 169.63 | 53.59 | 1253. | 46.10 | 0.70 | 47. |
| 66. | 4 | −68.00 | 171.89 | 7.07 | 12.39 | 52.46 | 1228. | 45.23 | 0.98 | 50. |
| 67. | 4 | −71.70 | 173.54 | 6.49 | 13.61 | 49.90 | 1176. | 43.23 | 1.58 | 57. |

-continued

LINK CLOSURE TABLE

| TIME (Min) | SAT | LAT (Deg) | LON (Deg) | DELMA (Deg) | AZ (Deg) | ALFA (Deg) | RANGE (Km) | BETA (Deg) | LM (dB) | MAXDR (Mbps) |
|---|---|---|---|---|---|---|---|---|---|---|
| 68. | 4 | −75.38 | 176.10 | 5.92 | 15.01 | 47.15 | 1126. | 41.03 | 2.18 | 66. |
| 69. | 4 | −79.00 | 180.48 | 5.34 | 16.64 | 44.19 | 1079. | 38.62 | 2.78 | 75. |
| 70. | 4 | −82.49 | 189.21 | 4.77 | 18.56 | 41.01 | 1034. | 35.98 | 3.38 | 86. |
| 71. | 4 | −85.51 | 211.27 | 4.19 | 20.89 | 37.62 | 993. | 33.13 | 3.96 | 99. |
| 72. | 4 | −86.50 | 265.49 | 3.62 | 23.79 | 34.01 | 955. | 30.05 | 4.51 | 112. |
| 73. | 4 | −84.30 | 305.17 | 3.05 | 27.50 | 30.23 | 921. | 26.79 | 5.02 | 126. |
| 74. | 4 | −81.00 | 319.41 | 2.47 | 32.43 | 26.33 | 892. | 23.40 | 5.48 | 140. |
| 75. | 4 | −77.43 | 325.72 | 1.90 | 39.25 | 22.43 | 869. | 19.98 | 5.87 | 153. |
| 76. | 4 | −73.78 | 329.14 | 1.32 | 49.04 | 18.76 | 850. | 16.73 | 6.17 | 165. |
| 77. | 4 | −70.09 | 331.23 | 0.75 | 63.33 | 15.70 | 838. | 14.02 | 6.39 | 173. |
| 78. | 4 | −66.38 | 332.61 | 0.17 | 83.01 | 13.88 | 832. | 12.41 | 6.49 | 177. |
| 79. | 4 | −62.65 | 333.58 | −0.40 | 105.41 | 13.93 | 832. | 12.44 | 6.49 | 177. |
| 80. | 4 | −58.92 | 334.26 | −0.98 | 124.91 | 15.81 | 838. | 14.12 | 6.38 | 173. |
| 81. | 4 | −55.18 | 334.77 | −1.55 | 139.01 | 18.92 | 851. | 16.87 | 6.16 | 164. |
| 82. | 4 | −51.44 | 335.15 | −2.13 | 148.64 | 22.63 | 870. | 20.15 | 5.85 | 153. |
| 83. | 4 | −47.69 | 335.43 | −2.70 | 155.34 | 26.56 | 894. | 23.60 | 5.45 | 139. |
| 84. | 4 | −43.95 | 335.63 | −3.28 | 160.18 | 30.49 | 923. | 27.02 | 4.99 | 125. |
| 85. | 4 | −40.20 | 335.79 | −3.85 | 163.81 | 34.30 | 958. | 30.30 | 4.47 | 111. |
| 86. | 4 | −36.45 | 335.90 | −4.43 | 166.63 | 37.93 | 996. | 33.39 | 3.91 | 98. |
| 87. | 4 | −32.69 | 335.98 | −5.00 | 168.88 | 41.35 | 1038. | 36.26 | 3.32 | 85. |
| 88. | 4 | −28.94 | 336.03 | −5.58 | 170.72 | 44.55 | 1084. | 38.91 | 2.71 | 74. |
| 89. | 4 | −25.19 | 336.06 | −6.15 | 172.26 | 47.53 | 1133. | 41.33 | 2.10 | 64. |
| 90. | 4 | −21.44 | 336.07 | −6.72 | 173.56 | 50.30 | 1184. | 43.54 | 1.49 | 56. |
| 91. | 4 | −17.68 | 336.08 | −7.30 | 174.69 | 52.87 | 1237. | 45.55 | 0.88 | 49. |
| 92. | 5 | −13.93 | 336.07 | 7.13 | 1.53 | 52.02 | 1219. | 44.89 | 1.08 | 51. |
| 93. | 5 | −10.17 | 336.05 | 6.55 | 0.90 | 49.31 | 1165. | 42.76 | 1.71 | 59. |
| 94. | 5 | −6.42 | 336.02 | 5.98 | 0.16 | 46.38 | 1113. | 40.40 | 2.34 | 68. |
| 95. | 5 | −2.66 | 336.00 | 5.40 | 0.76 | 43.21 | 1064. | 37.80 | 2.97 | 79. |
| 96. | 5 | 1.09 | 335.97 | 4.83 | 1.92 | 39.77 | 1018. | 34.94 | 3.60 | 91. |
| 97. | 5 | 4.85 | 335.94 | 4.25 | 3.43 | 36.07 | 976. | 31.81 | 4.20 | 105. |
| 98. | 5 | 8.60 | 335.92 | 3.68 | 5.30 | 32.09 | 937. | 28.40 | 4.78 | 119. |
| 99. | 5 | 12.35 | 335.90 | 3.10 | 7.85 | 27.86 | 903. | 24.74 | 5.31 | 135. |
| 100. | 5 | 16.11 | 335.88 | 2.53 | 11.49 | 23.42 | 874. | 20.84 | 5.77 | 150. |

The Link Closure Table indicates that the maximum allowable data rate varies with the cyclic variation in range and geometry between the communicating satellites. As shown, at the lowest range of 810 km, the link margin is the highest enabling he highest transmission data rate. Later in the cycle, the range increases and the geometry between the communicating satellites (described by the angle beta) degrades, causing a drop in link margin and a corresponding decrease in allowable data rate. Later again, a new cycle begins and link closure conditions improve and the allowable data rate again is high. Hence, the crosslink efficiency can be optimized by a cyclic variation in the transmission data rate as the communication satellite overflies the mission satellite. The communication method can therefore be enhanced to have a variable data transmission rate during the linkup interval depending on the cyclic variation in range and geometry between the mission satellite and the overhead communication satellite, having the highest data rate, for example 200 Mbps, at the overhead position at the midposition in the linkup excursion arc, and lowest data rate, for example 50 Mbps at the beginning and end of the excursion arc. The data rate could be stepped up and down by a clock in increments, such as, in 10 Mbps increments from the low 50 Mbps transmission rate up to the high 200 Mbps rate and then back down to low 50 Mbps, as the communication satellite travels through the linkup excursion arc over the mission satellite.

Further still, because of the difference in inclination angles of the orbits of the mission satellite and the communication satellites, the minimum and maximum range through the excursion arc varies with latitude. At the equator, the communication satellites pass directly overhead the mission satellite, whereas at the northern and southern most latitudes, the communication satellites pass at a maximum angular offset ($\Delta i$) from the plane of the mission satellite orbit. Hence, the range is minimum when a communication satellite is at the mid-point of the excursion arc and the mission satellite is near the equator, and the range is maximum when a communication satellite is at the beginning or end of the excursion arc and the mission satellite is near the poles. Thus, the maximum data transmission rate is determined by the available link margin which varies with the readily predicable range and geometry and can be varied through the linkup excursion arc and varied somewhat with satellite latitude.

Those skilled in the art are capable of deploying satellites in prescribed orbits and establishing communication links and hand-off procedures. The present invention is characterized by a mission satellite having matched nodal regression with at least one communication satellite. When matched to a ring of communication satellites, the method enables continuous real-time communication between the mission satellites and the ring of communication satellites that can then crosslink the communicated data around the globe and then downlink the communicated data to a desired ground station. Those skilled in the art can make enhancements, improvements, and modifications to enhance the invention. However, those enhancements, improvements, and modifications may nonetheless fall within the spirit and scope of the following claims.

What is claimed is:

1. A method of communicating data between a mission satellite and a communication satellite in a low earth communication orbit, the method comprising the steps of, deploying the mission satellite in a very low earth mission orbit having a mismatched inclination relative to the communication orbit for providing matched nodal regression of the mission orbit with the communication orbit as the communication satellite passes through an excursion arc relative to the mission satellite, the very low earth mission orbit and low earth communication orbit are defined by respective orbit planes intersecting along a line lying in an equatorial plane, computing a direction between the mission satellite and communication satellite as the communication satellite passes through the excursion arc, pointing an antenna in the direction of the communication satellite as the communication satellite passes through the excursion arc, and transmitting data through the antenna from the mission satellite to the communication satellite as transmitted data as the communication satellite passes through the excursion arc.

2. The method of claim 1 further comprising the step of, computing a range between the mission satellite and the communication satellite, the transmitted data is transmitted at a variable transmission data rate dependent on the range between the mission satellite and the communication satellite, the range being minimum at a mid point in the excursion arc at a highest transmission data rate.

3. The method of claim 1 wherein the antenna is a broad beam antenna.

4. The method of claim 1 the method further comprising the step of, pitching the mission satellite at a constant rate to continually rotate the mission satellite to point the mission satellite in a tangential direction along the mission orbit.

5. The method of claim 1 wherein the communication satellite is a plurality of communication satellites all traveling through the communication orbit as a ring of communication satellites orbiting the earth all traveling at a predetermined terrestrial angular velocity different than a predetermined terrestrial angular velocity of the mission satellite with the plurality of communication satellites passing through the excursion arc in succession relative to the mission satellite, the method further comprising the step of, determining when a first one of the plurality of communication satellites is entering the excursion arc and a second one of the plurality of communication satellites is exiting the excursion arc defined by a maximum mean anomaly difference between the mission satellite and any one of the communication satellites at the end of the excursion arc.

6. The method of claim 1 further comprising the steps of, cross link communicating the transmitted data from the communication satellite to another communication satellite.

7. The method of claim 1 further comprising the steps of down link communicating the transmitted data from the communication satellite to a terrestrial ground receiver.

8. The method of claim 1 further comprising the steps of, cross link communicating the transmitted data from the communication satellite to a second communication satellite, and down link communicating the transmitted data from the second communication satellite to a terrestrial ground receiver.

9. The method of claim 1 wherein, the low earth communication orbit is between 500 and 1500 km, the very low earth mission orbit is between 300 and 1000 km, and the very low earth mission orbit is lower than the low earth communication orbit.

10. The method of claim 1 wherein, the transmitted data is transmitted when the mission satellite is over the equator when the distance between the mission satellite and the communication is minimum.

11. The method of claim 1 wherein, the transmitted data is transmitted when the mission satellite is over the equator when the distance between the mission satellite and the communication is minimum, and the data is stored on-board the mission satellite until the mission satellite is over the equator when the data is transmitted as the transmitted data.

12. A method of communicating data between a mission satellite and a plurality of communication satellites in a low earth orbit communication orbit, the plurality of communication satellites all travel through low earth orbit as a ring of communication satellites orbiting the earth and traveling at a predetermined terrestrial angular velocity, the method comprising the steps of, deploying the mission satellite in a very low earth orbit mission orbit having a mission terrestrial angular velocity different than the communication terrestrial angular velocity and having a mismatch inclination relative to the communication orbit for providing matched nodal regression of the mission orbit with the communication orbit of the communication satellites with the communication satellites passing in succession through an excursion arc relative to the mission satellite, the very low earth mission orbit and low earth communication orbit are defined by respective planes intersecting along a line lying in an equatorial plane, pitching the mission satellite at a constant rate to continually rotate the mission satellite to point the mission satellite in a tangential direction along the very low earth orbit of the mission satellite, computing a direction between the mission satellite and a first one of the plurality of communication satellites as this first communication satellite passes through the excursion arc, pointing an antenna in the direction of the first communication satellite as this first communication satellite passes through the excursion arc, transmitting data through the antenna from the mission satellite to the first communication satellite as transmitted data as the first communication satellite passes through the excursion arc, determining when a second one of the plurality of communication satellites is entering the excursion arc as the first communication satellite is exiting the excursion arc at a maximum mean anomaly difference between the mission satellite and the first communication satellites at an end of the excursion arc, and pointing the antenna towards the second communication satellite for handing off of the transmitted data from the first communication satellite to the second communication satellite when the first communication satellite is at the end of the excursion arc.

13. The method of claim 12 further comprising the steps of, cross link communicating the transmitted data from the first communication satellite to another one of the plurality of communication satellites.

14. The method of claim 13 further comprising the steps of
  down link communicating the transmitted data from the first communication satellite to a terrestrial ground receiver.

15. The method of claim 13 further comprising the steps of,
  cross link communicating the transmitted data from the first communication satellites to the second of the plurality of communication satellites, and
  down link communicating the transmitted data from the second communication satellite to a terrestrial ground receiver.

16. The method of claim 13 further comprising the step of
  computing a range between the mission satellite and any one of the plurality of communication satellites within the excursion arc, the transmitted data is transmitted at a variable transmission data rate dependent on the range between the mission satellite and any one of the plurality of communication satellites traveling through the excursion arc, the range being minimum at a mid point in the excursion arc, and being maximum at the beginning and end of the excursion arc.

17. The method of claim 13 further comprising the steps of
  computing a range between the mission satellite and any one of the plurality of communication satellites within the excursion arc, the transmitted data is transmitted at a variable transmission data rate dependent on the range between the mission satellite and any one of the plurality of communication satellites traveling through the excursion arc, the range being minimum at a mid point in the excursion arc when the mission satellite is nearest the equator, and being maximum at the beginning and ends of the excursion arc when the mission satellite is nearest either of the south pole or the north pole.

18. The method of claim 13 wherein the antenna is a broad beam antenna.

19. A method of communicating data between a mission satellite and a plurality of communication satellites in a low earth orbit communication orbit, the plurality of communication satellites all travel through the low earth orbit as a ring of communication satellites orbiting the earth all traveling at a predetermined terrestrial angular velocity, the method comprising the steps of,
  deploying the mission satellite in a very low earth orbit mission orbit having a mission terrestrial angular velocity different than the communication terrestrial angular velocity and having a mismatch inclination relative to the communication orbit for providing matched nodal regression of mission orbit with the communication orbit of the communication satellites with the communication satellites passing in succession through an excursion arc relative to the mission satellite, the very low earth mission orbit and low earth communication orbit are defined by respective planes intersecting along a line lying in an equatorial plane,
  pitching the mission satellite at a constant rate to continually rotate the heading of the mission satellite to point the mission satellite in a tangential direction along the very low earth orbit of the mission satellite,
  computing a direction between the mission satellite and a first one of the plurality of communication satellites as this first communication satellite passes through the excursion arc,
  pointing an antenna in the direction of the first communication satellite as the first communication satellite passes through the excursion arc,
  computing the range between the mission satellite and the first communication satellite as the first communication satellite passes through the excursion arc,
  determining a transmission data rate within a minimum and maximum transmission rate dependent upon the range between the mission satellite and the first communication satellite, the transmission data rate is highest when the first communication satellite is at a mid point in the excursion arc and is the lowest at the beginning and end of the excursions arc,
  transmitting data through the antenna from the mission satellite to the first communication satellite as transmitted data at the data transmission rate as the first communication satellite passes through the excursion arc,
  periodically repeating the direction computing, antenna pointing, range computing, and transmission rate determination steps as the first communication satellite passes through the excursion arc,
  determining when another second one of the plurality of communication satellites is entering the excursion arc as the first communication satellite is exiting the excursion arc defined by a maximum mean anomaly difference between the mission satellite and the first communication satellite at an end of the excursion arc,
  pointing the antenna towards the second communication satellite for handing off of the transmitted data from the first communication satellite to the second communication satellite when the first communication satellite is at the end of the excursion arc, and
  repeating the direction computing, antenna pointing, distance computing, transmission data rate determining, and data transmitting steps for the second communication satellite and for each subsequent one of the plurality of communication satellites as each passes in succession through the excursion arc.

* * * * *